No. 673,054. Patented Apr. 30, 1901.
D. H. HOUSTON.
PANORAMIC CAMERA.
(Application filed May 7, 1900.)
(No Model.)

Witnesses
J. H. Gale
C. D. Field

Inventor
David Henderson Houston

UNITED STATES PATENT OFFICE.

DAVID HENDERSON HOUSTON, OF HUNTER, NORTH DAKOTA.

PANORAMIC CAMERA.

SPECIFICATION forming part of Letters Patent No. 673,054, dated April 30, 1901.

Application filed May 7, 1900. Serial No. 15,825. (No model.)

*To all whom it may concern:*

Be it known that I, DAVID HENDERSON HOUSTON, a citizen of the United States, residing at Hunter, in the county of Cass and State of North Dakota, have invented certain new and useful Improvements in Panoramic Cameras; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improved panoramic photographic camera in which can be used what have been termed "daylight-loading film-cartridges."

One object of my invention is the provision of a panoramic camera of improved construction and combination of parts.

Another object of my invention is the provision of a panoramic camera adapted to make more than one size of picture, the largest size being the length of the exposure-compartment of the camera, the next size smaller may be the length of the exposure-compartment shortened by the inward closing of one of the pivoted light-excluding shutters, and the smallest-sized picture may be the length of the exposure-compartment shortened by the inward closing of both of the pivoted light-excluding shutters.

My invention consists of a panoramic photographic camera of improved construction, and has combination of parts which are hereinafter described and the novel features pointed out in the claims of this specification.

Similar letters of reference refer to similar parts.

Figure 1:
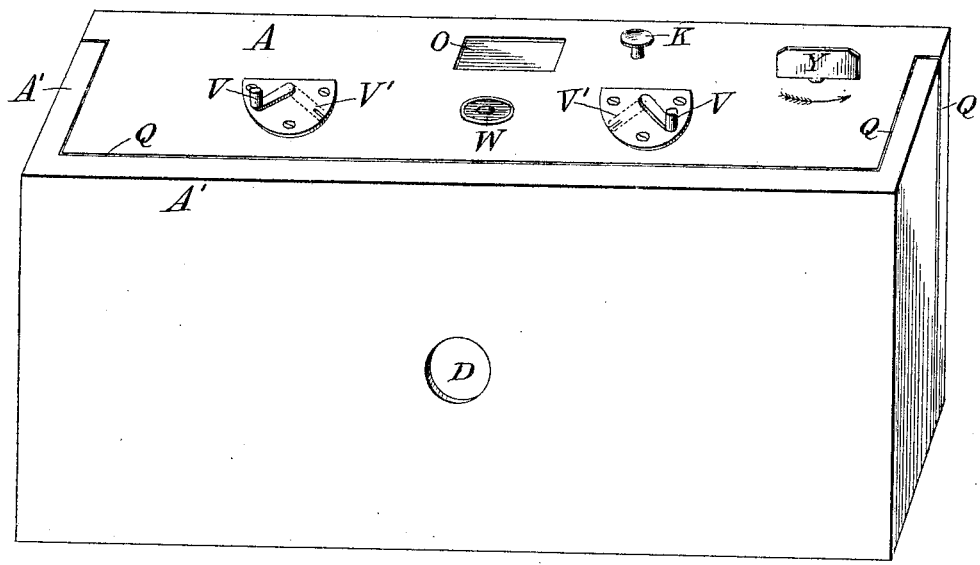
Figure 2:
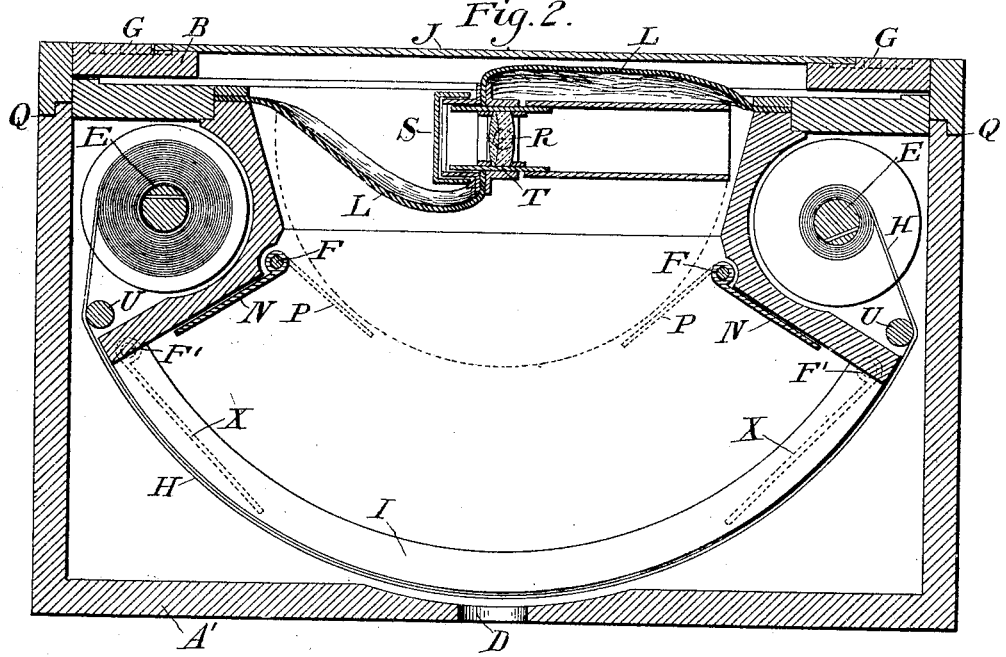

Figure 1 represents a perspective view of my camera, taken from the rear. Fig. 2 represents a horizontal sectional plan view of my camera, taken through the center.

In the drawings, A designates the casing, having a back and ends A', separating at the line Q.

B points out the folding front of the casing, having hinges at the dotted lines G G; J, the plate covering the cut-out portion of the center of the folding front of the casing; L, the flexible front projecting into the cut-out portion of the folding front; R, the pivoted lens and pivotal position of the lens-mount; T, the lens-mount; S, the lens-mount cap; D, the sight-aperture in the back of the camera-case; E, the spools for the sensitized film; H, the sensitized film; I, the lower one of the circularly-positioned film-guides; U, the guide-rollers; N, the pivoted light-excluding shutters; P, dotted lines, showing the position of the light-excluding shutters when turned inward.

X points out dotted lines that show a modified position for the pivoted light-excluding shutters, pivoted to fold at F', and which would be an equivalent of those shown at N P.

It can be seen that the pivoted light-excluding shutters N could be placed in reversed positions and pivoted at F' and if made larger than those at N and folded to the position of the dotted lines X that such pivoted light-excluding shutters placed in the modified positions would be the equivalent of the other pivoted light-excluding shutters placed at the positions F.

From this description, taken in connection with the drawings, the construction and operation of my invention may be readily understood; but the operation, briefly stated, is as follows: The panoramic camera here shown can be opened by withdrawing the back and ends of the camera-case, which will separate at the lines Q, and then the spool-chambers and the position of the sensitized film are accessible, and a spool of sensitized film can be inserted at E and the end of the black-paper covering of the film be passed around the outside of the guide-roller U and thence around the back of the circularly-positioned film-guides I and thence around the outside of the opposite guide-roller U' and attached to the reel-spool E', and then the camera-case is to be closed, and by winding the reel-spool key Y the black-paper covering at the end of the sensitized film is wound forward until the indicating mark, letter, or number shows in the sight-aperture D in the back of the camera-case. The lens-mount and lens are in position to operate; but to allow the view to be impressed on the film it is necessary to open the folding protective front of the camera and remove the cap from the lens-mount, and holding the camera level by observing the level W, and also observing the view in the view-finder O, press the button K and an impression will be thrown from the view through the pivoting lens upon the sensitized film behind the circularly-positioned film-guides I. If a view of three-quarters of the full length is wanted, then close inwardly the left-hand pivoted light-excluding shutter to the position P, and if a view of half the full length is wanted then close inwardly both of the pivoted light-excluding shutters to the position P, and which is done by moving the handle V on the top of the camera to the position of the dotted lines V'.

The folding front of the camera should always be kept closed when the camera is not in use.

I claim—

1. Combined in a panoramic camera, a case, a pivoted lens and lens-mount, two end compartments for holding the winding and supply spools, a central compartment placed betwixt the two end compartments, said central compartment limited at its posterior side by circularly-positioned film-guides adapted to guide a sensitized film in the circular-positioned focal field of the pivoted lens, spool and reel centers placed in the end compartments, and of an outer protective front on the camera-case, which front is adapted to open and close.

2. Combined in a panoramic camera, a case, a pivoted lens-mount and lens, two end compartments for holding the winding and supply spools, a central compartment placed betwixt the two end compartments, said central compartment limited at its posterior side by circularly-positioned film-guides adapted to guide a sensitized film in the circular-positioned focal field of the pivoted lens, and of spool and reel centers placed in the end compartments.

3. Combined in a panoramic camera, a case, a pivoted lens and lens-mount, two end compartments for holding the winding and supply spools, spool and reel centers in said end compartments, a central compartment for exposing the sensitized film to light coming from the scene through the lens, circularly-positioned stationary film-guides for guiding the sensitized film in the circular focal field of the pivoted lens, and of two pivoted light-excluding shutters arranged respectively at opposite ends of the central compartment, whereby an inward folding of said pivoted light-excluding shutters acts to shorten the length of the central compartment, and of means on the outside of the camera-case for controlling the position of the said pivoted light-excluding shutters.

In testimony whereof I affix my signature in presence of two witnesses.

DAVID HENDERSON HOUSTON.

Witnesses:
 J. H. GALE,
 C. D. FIELD.